United States Patent [19]
Haigh et al.

[11] Patent Number: 5,163,139
[45] Date of Patent: Nov. 10, 1992

[54] INSTRUCTION PREPROCESSOR FOR CONDITIONALLY COMBINING SHORT MEMORY INSTRUCTIONS INTO VIRTUAL LONG INSTRUCTIONS

[75] Inventors: Stephen G. Haigh, Redwood City; Toru Baji, Burlingame, both of Calif.

[73] Assignee: Hitachi America, Ltd., Brisbane, Calif.

[21] Appl. No.: 575,140

[22] Filed: Aug. 29, 1990

[51] Int. Cl.⁵ .......................... G06F 9/30; G06F 9/38
[52] U.S. Cl. ......................... 395/375; 364/228.7; 364/254.1; 364/247.6; 364/DIG. 1; 364/262.4
[58] Field of Search ... 364/200 MS File, 900 MS File; 395/375, 650, 775, 800

[56] References Cited

U.S. PATENT DOCUMENTS

| | | | |
|---|---|---|---|
| 3,611,306 | 10/1971 | Reigel et al. | 395/650 |
| 3,689,895 | 9/1972 | Kitamura | 364/200 |
| 3,766,527 | 10/1973 | Briley | 364/200 |
| 3,771,141 | 11/1973 | Culler | 395/375 |
| 3,775,756 | 11/1973 | Balser | 364/200 |
| 4,200,927 | 4/1980 | Hughes et al. | 395/375 |
| 4,471,426 | 9/1984 | McDonough | 395/800 |
| 4,594,655 | 6/1986 | Hao et al. | 395/775 |
| 4,594,659 | 6/1986 | Guenthner et al. | 395/375 |
| 4,752,873 | 6/1988 | Shonai et al. | 364/200 |
| 4,777,594 | 10/1988 | Jones et al. | 395/375 |
| 4,794,517 | 12/1988 | Jones et al. | 364/200 |
| 4,831,515 | 5/1989 | Kamada et al. | 364/200 |
| 4,837,678 | 6/1989 | Culler et al. | 364/200 |
| 4,916,652 | 4/1990 | Schwarz et al. | 364/748 |
| 4,942,525 | 7/1990 | Shintani et al. | 364/200 |
| 4,943,915 | 7/1990 | Wilhelm et al. | 364/200 |
| 4,945,511 | 7/1990 | Itomitsu et al. | 395/375 |
| 4,949,250 | 8/1990 | Bhandarkar et al. | 364/200 |
| 4,953,078 | 8/1990 | Petit | 364/200 |
| 4,956,770 | 9/1990 | Johnson et al. | 395/375 |
| 4,967,339 | 10/1990 | Fukumaru et al. | 364/200 |

OTHER PUBLICATIONS

"Supercomputer Expands Parallel Processing Operations", Computer Design, Aug. 15, 1985, pp. 76-81.
"Eliminating the Overhead of Floating Point Load and Store Instructions by Decoding Two Instructions per Cycle in the Floating Point Unit", T. K. M. Agerwala et al., IBM TDB, vol. 25, No. L, Jun. 1982, pp. 126-129.

*Primary Examiner*—Michael R. Fleming
*Assistant Examiner*—Gopal C. Ray
*Attorney, Agent, or Firm*—Flehr, Hohbach, Test, Albritton & Herbert

[57] ABSTRACT

An instruction memory apparatus for a data processing unit stores a sequence of instructions. At each instruction fetch cycle, two sequentially adjacent instructions are accessed. An instruction preprocessing unit, coupled to the internal instruction memory, combines the two sequentially adjacent instructions into a single long instruction word when the two instructions meet predefined criteria for being combined. The first of the two instructions is combined with a no-operation instruction to generate a long instruction word when the predefined criteria are not met. In that case, the second instruction [may be accessed again] is used during the next instruction fetch cycle as the first of the two sequentially adjacent instructions to be processed during that next instruction fetch cycle.

11 Claims, 5 Drawing Sheets

INSTRUCTION PREPROCESSOR FOR CONDITIONALLY COMBINING SHORT MEMORY INSTRUCTIONS INTO VIRTUAL LONG INSTRUCTIONS

The present invention relates generally to digital signal processors and particularly to methods and systems for providing or generating long instruction words, which are efficient for high speed processing, while using a short word instruction memory.

BACKGROUND OF THE INVENTION

In some computer architectures the use of very long instructions words, such as instructions words which are 60-bits or 64-bits long, can facilitate efficient performance. However, the use of long instruction words is expensive in terms of program storage because many program instructions do not require the use of such long instructions words.

In digital signal processors, program instructions can generally be divided into load/store instructions, which load values from the processor's random access memory into the processor's registers or store back register values into memory, and arithmetic instructions, which perform mathematical computations. While the mathematical computations make use of the processor's registers, the digital signal processor of the present invention takes advantage of the fact that a load/store instruction can be performed simultaneously with an arithmetic instruction.

In practice, concurrent execution of load/store and arithmetic operations is use primarily in the "number-crunching" portions of digital signal processing programs. Almost all other portions of digital signal programs comprise sequences of load/store operations or sequences of arithmetic operations which cannot be executed concurrently. Therefore it is not efficient to store in program memory long instruction words which contain both load/store and arithmetic operations.

The present invention forms long instruction words from sequences of shorter instruction words when combining such sequences of shorting instruction words into a single instruction comprises an allowed combination, as determined by a set of predefined rules. Short instructions each perform only a load/store or only an arithmetic operation. A long instructions is a combination of a load/store instruction and an arithmetic instruction. Long instructions can also be applied to implement two-word instructions in one machine cycle. The present invention allows the system to store short instruction words in external program memory, which is efficient for memory storage purposes, and to dynamically combine short instructions into long instructions, which is efficient for executing programs.

SUMMARY OF THE INVENTION

In summary, the present invention is an instruction memory apparatus for a data processing unit. An instruction memory stores a sequence of instructions. At each instruction fetch cycle, two sequentially adjacent instructions are accessed An instruction preprocessing unit, coupled to the instruction memory, combines the two sequentially adjacent instructions into a single long instruction word when the two instructions meet predefined criteria for being combined. The first of the two adjacent instructions is combined with a no-operation instruction to generate a long instruction word when the predefined criteria are not met. In that case, the second instruction is accessed again during the next instruction fetch cycle as the first of two adjacent instructions.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
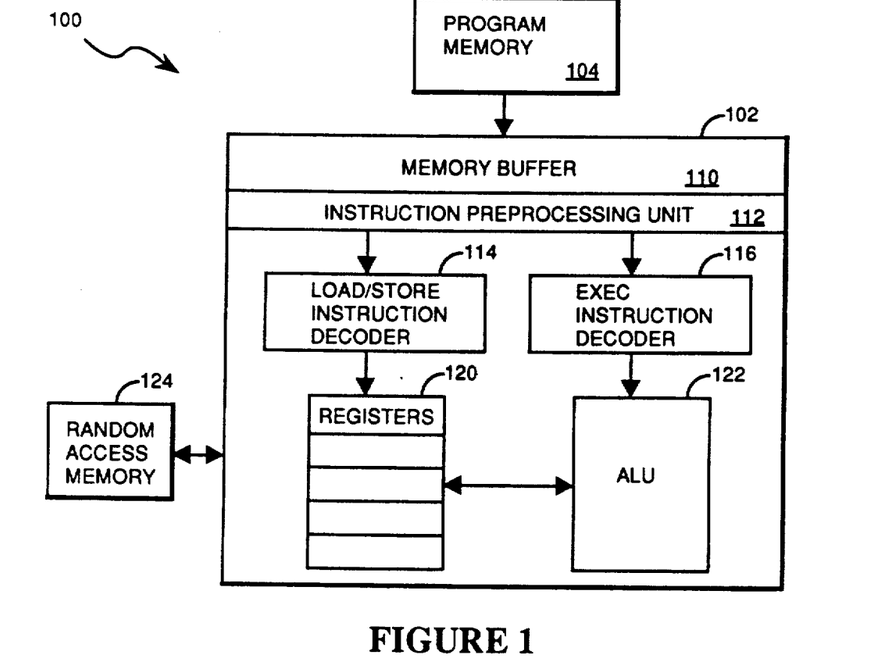
FIG. 1 is a block diagram of a digital signal processor with an instruction memory buffer and an instruction preprocessing unit.

Referring to FIG. 1, there is shown a data processing system 100, having a digital signal processor (DSP) 102 coupled to a program memory 104. The program memory 104 is typically random access memory (RAM) or read only memory (ROM), although other types of memory systems may be used. In any case, the DSP 102 fetches program instructions from the program memory and temporarily stores those instructions in a memory buffer 110 which is used as a memory cache. For instance, the memory buffer 110 may have a storage capacity of 512 instruction words, each of which is thirty-two bits long. The exact mechanism and timing control used for loading data into the internal memory buffer 110 may vary from implementation to implementation.

SHORT AND LONG INSTRUCTION WORDS

The basic principal used in the present invention is that a long instruction word (e.g., 60 to 64 bits) is used internal to the DSP 102, because it allows a high degree of orthogonality and parallelism in the instruction set, but the program memory 104 stores shorter instruction words (e.g., 32 bits long) because a 32-bit wide program memory 104 and a 32-bit wide interface between the DSP 102 and the program memory are much less expensive than they would be for a 64-bit wide program memory. An instruction preprocessing unit 112 is used to convert pairs of short instruction words into long instruction words, and then deliver them to the DSP's instruction decoders 114 and 116.

The DSP 102 has two instruction decoders 114 and 116. The first instruction decoder 114 is used to decode register load and store instructions, which are instructions used to load values from a random access memory 124 into the processor's registers 120 or to store back values from registers 120 to memory 124. The second instruction decoder 116 decodes arithmetic and execution control instructions, which are executed by the DSP's arithmetic logic unit 122 to perform mathematical computations, including multiplication and accumulation operations. Arithmetic and execution control instructions are herein collectively called arithmetic instructions, and the hardware circuits for processing these instructions are labelled EXEC in the Figures.

While the mathematical computations make use of the processor's registers, the use of parallel instruction decoders 114 and 116 takes advantage of the fact that a load/store instruction can be performed simultaneously with an arithmetic instruction. In should be noted that in the preferred embodiment, the registers used in the DSP 102 are master-slave type registers, which allows the DSP to simultaneously read previously loaded data and to write new data into a register without any interference between the two simultaneous operations. Therefore when a long instruction has a load/store operation and an arithmetic operation, both of which use the same register(s), the arithmetic operation uses the value previously loaded into the register(s) while the load/store operation loads a new value into the very same register(s).

Figure 2:
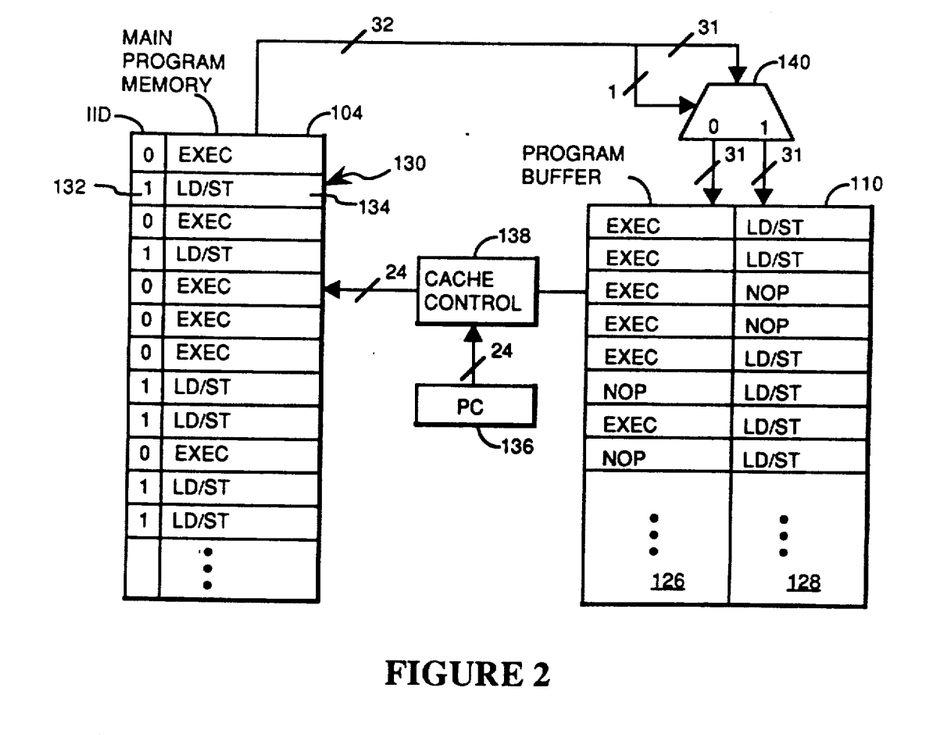
FIG. 2 is a conceptual block diagram of an instruction memory buffer for generating and storing long instruction words.

Referring to FIG. 2, there is shown one way of combining short instructions into long instructions. The internal program buffer 110 has two columns 126 and 128, column 126 being used to store arithmetic instructions and column 128 being used to store load/store instructions. Each thirty-two bit instruction 130 in the program memory 104 contains a one-bit instruction identifier IID 132, and a thirty-one bit instruction code 134. IID equals zero (0) for arithmetic instructions, and it equals one (1) for load/store instructions.

As the DSP's program counter 136 increments, and instructions are read into the internal program buffer 110 under the control of a cache controller 138. An instruction input demultiplexer 140, controlled by the IID bit from each instruction, switches the remaining thirty-one bit instruction code into either the arithmetic instruction column 126 or the load/store column 128 of the internal program buffer 110.

If two sequentially fetched instructions are "compatible", as defined by some predefined criteria, then both instructions are loaded into a single row of the internal memory buffer 110, thereby combining the two instructions into a single long instruction word. If the two sequentially fetched instructions are not compatible, then they are loaded into separate rows and a "NOP" (i.e., no-operation) instruction is loaded into the unused slot of one of the rows.

Figure 3:
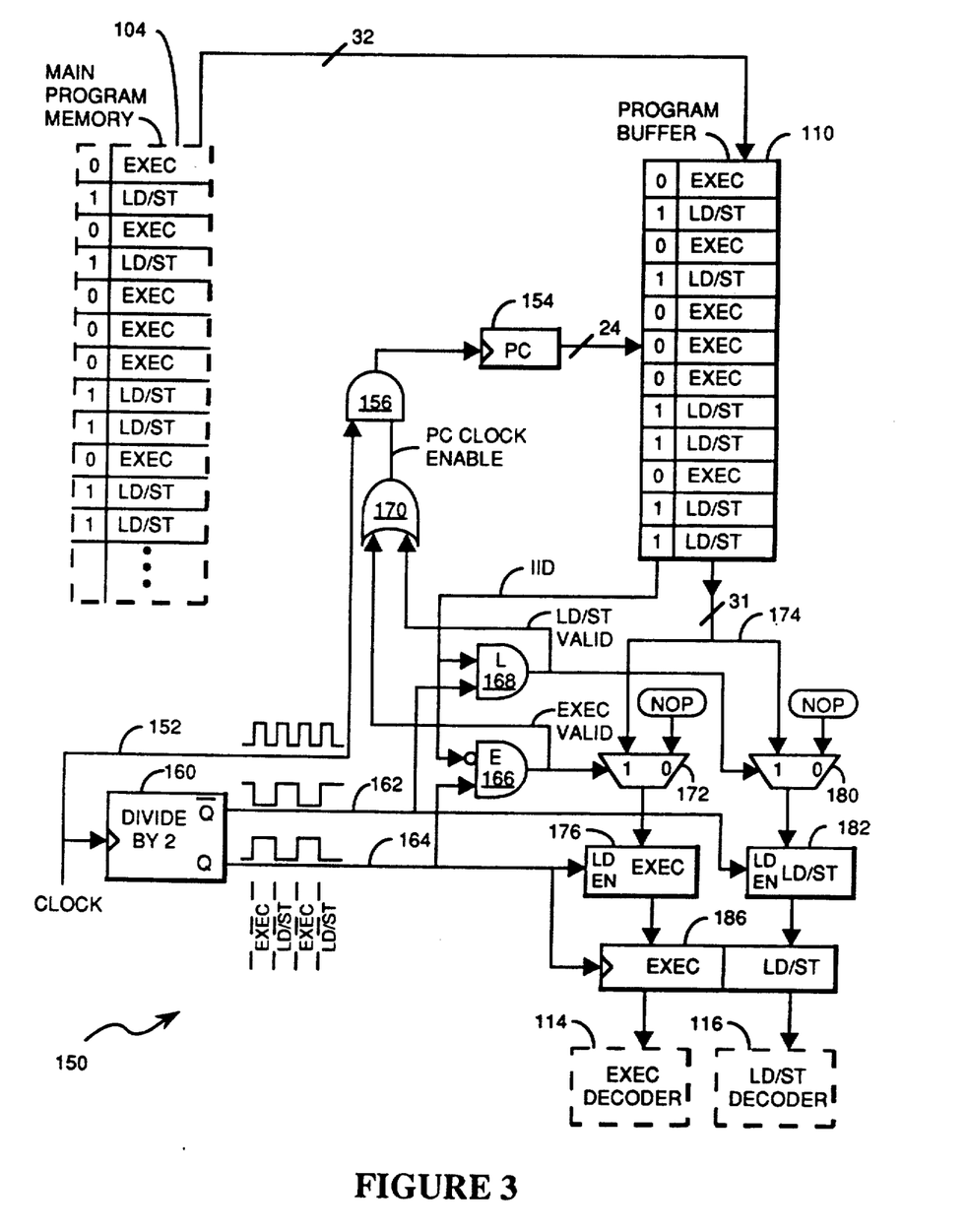
FIG. 3 is a block diagram of a first preferred embodiment of the present invention.

For instance, the predefined compatibility rule in the first preferred embodiment of the present invention, shown in FIG. 3, is as follows: If an arithmetic instruction is followed by a load/store instruction, the two are combined into a single long instruction word by placing the load/store instruction along side the arithmetic instruction. If one execute instruction immediately follows another arithmetic instruction, the corresponding load/store field for the first arithmetic instruction is filled with a NOP, and the second arithmetic instruction is stored in the next row of the internal program buffer. The same is true for two or more load/store instructions in a sequence: a NOP will be placed in the arithmetic instruction fields of the load/store instructions that cannot be combined with an arithmetic instruction.

Figure 4:
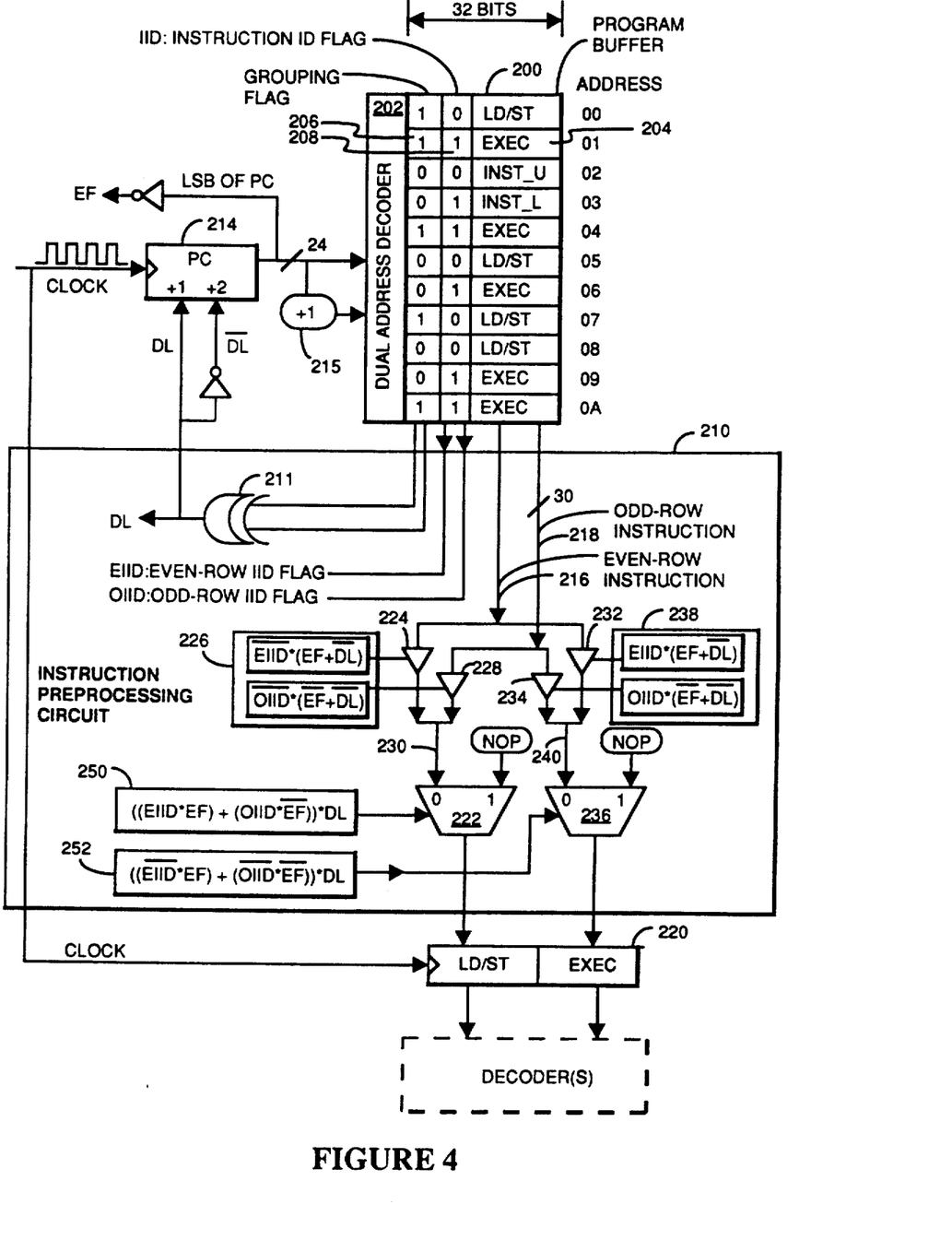
FIG. 4 is a block diagram of a second preferred embodiment of the present invention.
Figure 5:
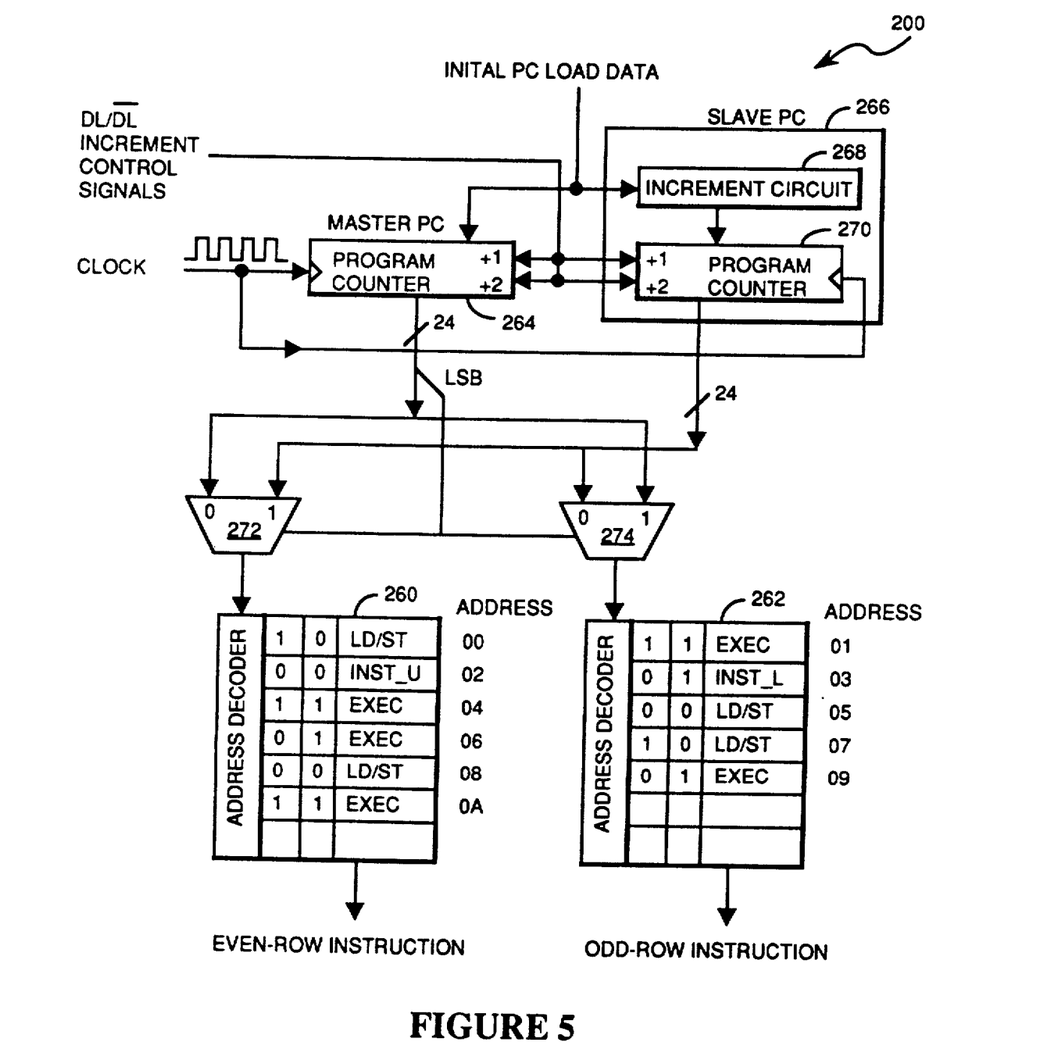
FIG. 5 is a block diagram of a memory buffer suitable for implementing the memory buffer portion of the present invention.

In the second and third preferred embodiments, shown in FIGS. 4 and 5, the predefined compatibility rule is the opposite of that in the first preferred embodiment: If a load/store instruction is followed by an arithmetic instruction, the two are combined into a single long instruction word by placing the load/store instruction along side the arithmetic instruction. Thus there are number of different rules that can be used to determine whether two sequentially accessed instructions can be combined into a long instruction word. Other implementations of the invention might combine an arithmetic instruction with a load/store instruction regardless of the order in which they occur in the program.

A DSP 102 that fetches and executes program instructions directly from a program memory has a maximum execution speed of one instruction per fetch cycle. However, using the internal memory buffer of the present invention, when a program has a loop or other code that has been pre-fetched into the internal memory buffer, an arithmetic and a load/store instruction can be executed simultaneously, thereby yielding two times the performance of the DSP which uses only a program memory.

The same speed performance could be achieved by using a 62-bit or 64-bit wide program memory and a similarly wide program memory interface on the DSP. However, such a wide memory interface is expensive to implement, and it would also result in an excessively large program size, because a large number of the instructions stored in the program memory would contain NOPs in fields where it was not possible to combine arithmetic and load/store instructions into a single long instruction word.

To achieve maximum processor performance with a DSP incorporating the present invention, the programmer, or program compiler, must schedule the instruction sequence so that arithmetic and load/store instructions are interleaved. Such interleaving allows arithmetic and load/store instructions to be executed in parallel. If such interleaving cannot be used, the program will still execute correctly, but the DSP's resources will be under utilized.

FIRST PREFERRED EMBODIMENT

Referring to FIG. 3, there is shown a preferred embodiment of the internal instruction memory buffer 110 and one version of an instruction preprocessing unit 150 for combining sequentially accessed instructions when those instructions are deemed to be compatible. This circuit 150 splits a serial stream of 32-bit wide instructions into two paths so as to generate a sequence of 62-bit wide parallel instructions.

Generally, the way this circuit 150 works is that each fetch cycle is split into an EXEC phase and a LD/ST phase. Assume that the program counter 154 increments at the beginning of the EXEC phase of a first clock cycle and a new instruction is accessed. If the instruction accessed during the EXEC phase is an arithmetic instruction (IID=0), the program counter 154 is incremented at the beginning of the LD/ST phase and a second instruction is accessed during the LD/ST phase. If the second instruction is a load/store instruction with an IID=1 (i.e., if it is an instruction that can be combined with the first accessed instruction), the two instructions are simultaneously loaded into a pipeline register 186 for transmission to the DSP's instruction decoders 114, 116. If the second instruction is not a load/store instruction, a NOP instruction is loaded with the first (arithmetic) instruction into the pipeline register 186, and the program counter 154 is not incremented at the beginning of the next EXEC clock phase. If the first instruction accessed during the EXEC clock phase was a load/store instruction, it is loaded with a NOP instruction into the pipeline register and the program counter 154 is not incremented until the beginning of the next EXEC clock phase.

More specifically, the circuit 150 works as follows. In this embodiment, the instruction preprocessor 150 uses a clock signal on line 152 which runs at twice the instruction fetch rate. The clock signal on line 152 increments the program counter 154 when the clock signal is passed by AND gate 156.

The clock signal is divided down by a flip-flop circuit 160 to generate two complementary clock signals a LD/ST (i.e., load/store) phase signal on line 162 and an EXEC phase signal on line 164. Thus, each instruction fetch cycle (comprising two clock cycles of the clock signal on line 152) has two phases: an EXEC phase during which the EXEC phase signal on line 164 is enabled (i.e., high), and a LD/ST phase during which the LD/ST phase clock signal on line 162 is enabled.

The instruction identifier IID from each accessed instruction is logically ANDed with each of these phase clocks by AND gates 166 and 168. AND gate 166 generates an enabled output signal, called EXEC VALID, during the EXEC clock phase if the access instruction has an IID equal to 0, meaning that the accessed instruction is an arithmetic instruction. AND gate 168 generates an enabled output signal, called LD/ST VALID, during the load/store clock phase if the access instruction has an IID equal to 1, meaning that the accessed instruction is a load/store instruction. The EXEC VALID and LD/ST VALID signals are logically ORed by OR gate 170 to generate a signal called PC CLOCK ENABLE. Whenever the PC CLOCK ENABLE signal is ON, the next pulse of the clock signal on line 152 is passed by AND gate 156, thereby incrementing the program counter PC 154.

The EXEC VALID signal generated by AND gate 166 determines whether multiplexer 172 loads a NOP instruction or the instruction code on line 174, read from the cache memory buffer 110 during the EXEC phase, into pipeline register 176. If the instruction accessed during the EXEC phase is an arithmetic instruction, this instruction is loaded into pipeline register 176, otherwise a NOP instruction is loaded.

Similarly, the LD/ST VALID signal generated by AND gate 168 determines whether multiplexer 180 loads a NOP instruction or the instruction accessed during the LD/ST phase into pipeline register 182. If the instruction accessed during the LD/ST phase is a load/store instruction, this instruction is loaded into pipeline register 182, otherwise a NOP instruction is loaded.

At the end of each fetch cycle (i.e., at the beginning of the next EXEC phase) the instruction codes and/or NOP instructions stored in the pipeline registers 176 and 182 are then loaded into another pipeline register 186, which is used to store the current instruction word as it is being decoded by the DSP's decoders 114 and 116.

Optimum computational efficiency is achieved by sequencing the program with alternating load/store and arithmetic instructions, but no space is wasted in the program memory 104 (nor in the internal cache memory buffer 110) if the ideal instruction sequence is not achieved.

SECOND PREFERRED EMBODIMENT

Referring to FIG. 4, in a second embodiment of the invention, the internal cache memory 200 has a dual address decoder for simultaneously accessing two instructions (i.e., two rows of data) from the cache. Each row 202 of the internal cache memory contains a thirty-bit instruction code 204, and two flags: an instruction identifier IID 206, plus a grouping flag 208. The instruction identifier IID 206 in this embodiment has the opposite definition from the one used in the first preferred embodiment. In particular, IID is equal to 0 for load/store instructions and for the upper word of a long instruction, and is equal to 1 for arithmetic instructions and for the lower word of a long instruction. Thus this embodiment envisions three types of instructions: arithmetic instructions, load/store instructions and "long" instructions (i.e., instructions which inherently occupy 60 to 64 bits).

The instruction preprocessing circuit 210 in this embodiment of the invention works as follows. When two sequentially stored instructions are accessed from the cache 200, if the grouping flags from both instructions are equal, then those two instructions will be combined into a long instruction word. If the grouping flags are not equal, then the instruction accessed from the lower address location (herein called the first address location) is combined with a NOP instruction, in which case the second accessed instruction is used during the next instruction fetch cycle (unless a jump instruction causes the program counter to be reloaded with a new value). Thus, in this embodiment, the order of EXEC and LD/ST instructions is not used to determine whether to combine instructions. Instead, a grouping flag for each instruction is used to explicitly make this determination.

The two grouping flags are input to an exclusive OR gate 211, to generate a "different line" signal DL. DL is enabled if the two grouping flags are unequal (i.e., the two instructions belong on different lines of the program, when using long instruction word format), and is disabled when the two grouping flags are equal. As shown in FIG. 4, the DL signal is also used to determine whether the program counter 214 increments by a count of one or two at the beginning of the next instruction fetch cycle. The least significant bit of the address value output by the program counter 214 is inverted to generate a signal herein called the even flag (EF) signal. EF is equal to 1 whenever the program counter is pointing to an instruction at an even address. A slave unit 215 outputs a value equal to the output of the program counter plus one.

Since two instructions are read during each instruction fetch cycle, two labels are used to distinguish between the instruction identifiers of these two instructions. In particular, since the two instructions are retrieved from sequential locations in the cache 200, one will have an even address value (i.e., an address with a least significant bit equal to zero) and one will have an odd address value. The IID from the instruction at an even address is called EIID, and the IID from the instruction at the odd address is called OIID. The instruction code 204 from the row of the cache located at an even address is transmitted on bus 216 and the instruction code from the row of the cache located at an odd address is transmitted on bus 218.

Next, the two accessed instructions must be preprocessed so as to properly load one or both instructions into a pipeline register 220. The instruction code on bus 216 from the accessed even-row, is passed to the "0" input multiplexer 222 by buffer 224 if it is a load/store instruction (EIID=0) and either this is the instruction being pointed to by the program counter or both accessed instructions are to be loaded into the pipeline register 220. The idea here is that the control logic 226 for buffers 224 and 228 avoids asserting two load/store instructions simultaneously on line 230 if both accessed instructions are load/store instructions. Similarly, the instruction code on bus 218 from the accessed odd-row, is passed to the "0" input of multiplexer 222 by buffer 228 if it is a load/store instruction (OIID=0) and logic 226 determines that either this is the instruction being pointed to by the program counter or both accessed instructions are to be loaded into the pipeline register 220.

Buffers 232 and 234 pass instructions from the even and odd instruction busses 216 and 218 to the "0" input of multiplexer 236, under the control of logic 238 via line 240, using the same control strategy as for multiplexer 222, except that arithmetic instructions (EIID=1 or OIID=1) are passed to this multiplexer. The boolean logic equations shown in FIG. 4 for the control logic circuits 226 and 238 are easily implemented using a small number of inverters, NAND and NOR gates.

Control logic circuits 250 and 252 determine whether multiplexers 222 and 236 pass the instructions on line 230 and 240 or a no-operation (NOP) instruction to pipeline register 220. If the two retrieved instructions have the same grouping flag, making DL equal to 0, then logic circuits 250 and 252 both output a value of "0", causing both multiplexers to pass the retrieved instructions (which are now found on lines 230 and 240) to the pipeline register 220. These instructions are latched into the pipeline register 220 by the clock signal at the beginning of the next instruction fetch cycle.

If the two retrieved instructions do not have the same grouping flag, making DL equal to 1, then logic circuit 250 will transmit a NOP to the "LD/ST" portion of pipeline register 220 if the instruction being pointed to by the program counter is an arithmetic instruction (OIID or EIID=1) and otherwise will pass to the LD/ST portion of pipeline register 220 the retrieved instruction on its "0" input port. Similarly, if the two retrieved instructions do not have the same grouping flag (DL=1), then logic circuit 252 will transmit a NOP to the EXEC portion of pipeline register 220 if the instruction being pointed to by the program counter is a load/store instruction (OIID or EIID=0) and otherwise will pass to the pipeline register 220 the retrieved instruction on its "0" input port.

Referring to FIG. 5, there is shown one embodiment of the instruction memory cache 200 for use in conjunction with the embodiment of the invention shown in FIG. 4. This memory cache 200 has two memory banks 260 and 262, bank 260 being used to store instructions at even address locations and bank 262 being used to store instructions at odd address locations. There are also two program counters, a master program counter 264 and a slave program counter 266 which always outputs a value that is one greater than the output of counter 264.

Both program counters are loaded with initial values. The master program counter is loaded with a specified value, and the slave program counter uses an increment circuit 268 to increment that value by one before loading it into counter circuit 270. Thereafter, until a new starting address is loaded into the program counters, both counters 264 and 266 are incremented by the same amounts (1 or 2) at the beginning of each fetch cycle.

The outputs from the two program counters 264 and 266 are such that two multiplexers 272 and 274 are needed to determine which counter output should go to each memory bank 260, 262. Multiplexer 272 sends one of the two count values to memory bank 260 and multiplexer 274 sends the other one of the two count values to memory bank 262. In particular, the least significant bit (LSB) of the count value output by the master program counter 264 is used to specify which input of each multiplexer 272, 274 is to be used. If the LSB is equal to 0, then the master program counter 264 is outputting an even value (and the slave counter 266 is outputting an odd value), and therefore the master program count value is used for the even memory bank 260 and the slave program count value is used for the odd memory bank 262. If the LSB is equal to 1, the master program count value is used for the odd memory bank 262 and the slave program count value is used for the odd memory bank 260.

Table 1 lists an example of a FIR filter program using the present invention. With regard to the first housekeeping section in the program in Table 1, it may be noted that using a 30-bit or 32-bit instruction length for EXEC and LD/ST instructions allows for more functions and memory/register resources than in DSPs which use only a single 32-bit instruction set. The "number crunching section" of the program makes use of parallel EXEC and LD/ST operations. Since the number crunching section is short, all instructions will be accessed from the memory cache 200, without having to access program memory 104. Furthermore, while the number crunching section is short, it is repeated many times, which makes the parallel processing of arithmetic and load/store instructions effective, even though such parallel processing is used in only a small number of lines of the signal processing program.

TABLE 1

FIR DSP PROGRAM

| INSTR TYPE | CODE | DESCRIPTION/COMMENTS |
|---|---|---|
| HOUSEKEEPING SECTION OF CODE | | |
| EXEC | R3=SCALE | /*Load im.scaling constant |
| EXEC | A0=$0 | /*base address for data |
| EXEC | A8=$100 | /*base address for coefficient |
| EXEC | MR=TAP_NUMBER | /*modulo size <-filter tap no. |
| EXEC | A1=TAP_NUMBER-2 | /*repeat count |
| | fstart: | |
| EXEC | WAIT(SIR) | /*wait for serial input |
| EXEC | R4=sir | /*fetch serial input |
| EXEC | R4=FLOAT(R3) | /*data conversion |
| LD/ST | *A0=R4 | /*store as latest data |
| LD/ST | R0=*A0++% R1=*A8++% | /*load data and coefficient to start /*pipeline |
| LD/ST\|EXEC | R0=*A0++% R1=*A8++% \|\| FR2=R0*R1 | /*load and multiply to start pipeline |
| EXEC | REPEAT A1 { | |

TABLE 1-continued

FIR DSP PROGRAM

| INSTR TYPE | CODE | DESCRIPTION/COMMENTS |
|---|---|---|
| NUMBER CRUNCHING SECTION OF CODE | | |
| LD/ST\|EXEC | R0=*A0++% R1=*A8++% \|\| FR2=R0*R1 \|\| FR5+=R2 | /*filter core |
| EXEC | FR2=R0*R1 \|\| FR5+=R2 | /*multiply and accumulate to finish /*pipeline |
| EXEC | FR5+=R2 | /*accumulate to finish pipeline |
| HOUSEKEEPING SECTION OF CODE | | |
| EXEC | A0−=$1 | /*data pointer dec |
| EXEC | R5=FIX(R3) | /*data conversion |
| EXEC | SOR=R5 | /*data out |
| EXEC | WAIT(SOR) | /*wait for serial output |
| EXEC | GO TO fstart | |

THIRD PREFERRED EMBODIMENT

Figure 6:
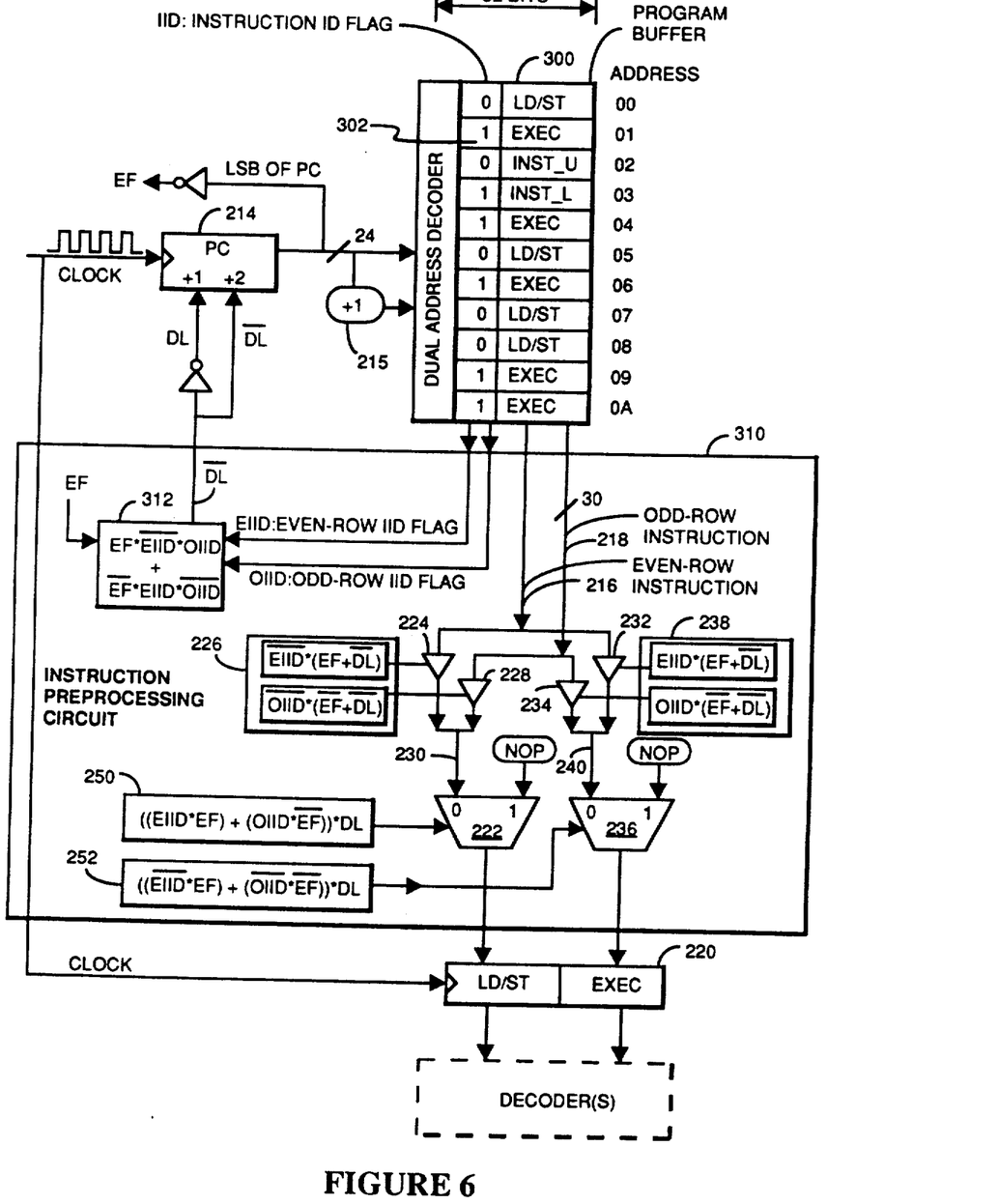
FIG. 6 is a block diagram of a third preferred embodiment of the present invention.

Referring to FIG. 6, this embodiment is a variation on the second embodiment shown in FIG. 4 and described above. In particular, the instruction memory cache 300 includes a one-bit instruction identifier IID 302 for each row, but does not include a grouping flag. This allows the instruction code for each instruction to be thirty-one bits long instead of only thirty bits.

To implement the instruction processor circuit 310 for this embodiment, there is a special logic circuit 312 which generates the "different line" DL signal based on the even-row instruction identifier EIID, odd-row instruction identifier OIID and even flag EF. In particular, DL equals 0 and the two retrieved instructions are combined into a long instruction word only if the first retrieved instruction is a LD/ST instruction with IID=0 and the second retrieved instruction is an EXEC instruction with IID=1. The EF signal is used by logic circuit 312 to determine whether the even instruction or the odd instruction is the first retrieved instruction, thereby allowing the following boolean formula for DL to be used:

$$DL = (EF^*EIID^*OIID) + (\overline{EF}^*EIID^*OIID)$$

Otherwise, the hardware in this embodiment is the same as that for the second preferred embodiment, shown in FIG. 4.

Using this embodiment, if the programmer desires to intentionally program the following program sequence:

| LD/ST | NOP |
|---|---|
| NOP | EXEC | the programmer must insert a NOP instruction in the program memory between the LD/ST instruction and the EXEC instruction. This means a certain loss in the compression ratio of the stored program to the final executed program, but such instruction sequences requiring the explicit programming of NOP instructions are likely to occur only infrequently.

ALTERNATE EMBODIMENTS

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. Instruction memory apparatus for a data processing unit, comprising:

storage means for storing a sequence of instructions at a sequence of address locations, including means for accessing a pair of sequentially adjacent instructions, a first one of which is stored in said storage means at a specified address location and a second one of which is stored at an address location following said specified address location; and instruction preprocessing means, coupled to said storage means, for combining said pair of sequentially adjacent instructions into a single long instruction word when said pair of sequentially adjacent instructions meet predefined criteria for being combined;

said instruction preprocessing means generating a long instruction word from said first one of said pair of sequentially adjacent instructions and a predefined no-operation instruction when said predefined criteria are not met;

said predefined criteria comprising the requirement that one of said pair of sequentially adjacent instructions be an instruction selected from a first predefined set of instructions, and that the other of said pair of sequentially adjacent instructions be an instruction selected from a second, distinct, predefined set of instructions;

wherein, when said predefined criteria are not met in a first instruction processing cycle, said access means accesses said second one of said pair of sequentially adjacent instructions from said first instruction processing cycle as the first one of said pair of sequentially adjacent instructions in a next instruction processing cycle.

2. The instruction memory apparatus of claim 1, further including:

a program counter coupled to said storage means and instruction preprocessing means, said program counter generating said specified address and including means for incrementing said specified address by a value of one when said instruction preprocessing means generates a long instruction word from only said first one of said pair of sequentially adjacent instructions, and for incrementing said specified address by a value of two when said instruction preprocessing means combines said pair of sequentially adjacent instructions into a single long instruction word.

3. The instruction memory apparatus of claim 1, said instruction preprocessing means including means for generating a long instruction word from only said first one of said pair of sequentially adjacent instructions when said predefined criteria are not met by combining said first instruction with a predefined no-operation instruction to form a long instruction word.

4. The instruction memory apparatus of claim 3, said accessing means in said storage means simultaneously accessing a pair of sequentially adjacent instructions.

5. Instruction memory apparatus for a digital signal processing unit, said digital signal processing unit including a first instruction decoder for decoding register store and load instructions, and a second instruction decoder for decoding signal processing instructions, said instruction memory apparatus comprising:

storage means for storing a sequence of instructions at a sequence of address locations, including means for accessing a pair of sequentially adjacent instructions, a first one of which is stored in said storage means at a specified address location;

instruction preprocessing means, coupled to said storage means, for combining said pair of sequentially adjacent instructions into a single long instruction word when said pair of instructions meet predefined criteria for being combined, and for generating a long instruction word from said first one of said pair of sequentially adjacent instructions and a predefined no-operation instruction when said predefined criteria are not met;

said predefined criteria comprising the requirement that one of said pair of sequentially adjacent instructions be an instruction selected from the set consisting of register store instructions and register load instructions, and that the other of said pair of sequentially adjacent instructions be a signal processing instruction; and a program counter coupled to said storage means an instruction preprocessing means, said program counter generating said specified address and including means for incrementing said specified address by a value of one when said instruction preprocessing means generates a long instruction word from said first one of said pair of sequentially adjacent instructions and said predefined no-operation instruction, and for incrementing said specified address by a value of two when said instruction preprocessing means combines said pair of sequentially adjacent instructions into a single long instruction word;

wherein, when said predefined criteria are not met during a first instruction processing cycle, said access means accesses a second of said pair of sequentially adjacent instructions from said first instruction processing cycle as the first one of said pair of sequentially adjacent instructions in a next instruction processing cycle.

6. The instruction memory apparatus of claim 6, said accessing means in said storage means simultaneously accessing a pair of sequentially adjacent instructions.

7. A method of storing and fetching instructions for a data processing unit having an instruction preprocessor, the steps of the method performed by said instruction preprocessor comprising:

storing a sequence of instructions at a sequence of address locations in a memory;

accessing a pair of instructions stored at sequentially adjacent address locations in said memory, a first one of said pair of instructions being stored at a specified address location in said memory and a second one of said pair of instructions being stored at an address location following said specified address location; and combining said pair of instructions into a single long instruction word when said pair of instructions meet predefined criteria for being combined;

said combining step generating a long instruction word from said first one of said pair of instructions and a predefined no-operation instruction when said predefined criteria are not met;

said predefined criteria comprising the requirement that one of said pair of sequentially adjacent instructions be an instruction selected from a first predefined set of instructions, and that the other of said pair of sequentially adjacent instructions be an instruction selected from a second, distinct, predefined set of instructions;

wherein, when said predefined criteria are not met in a first instruction processing cycle, said accessing step accesses said second one of said pair of instructions from said first instruction processing cycle as the first one of said pair of instructions in a next instruction processing cycle.

8. The method of storing and fetching instructions set forth in claim 10, further including the steps of:

incrementing said specified address by a value of one when said combining step generates a long instruction word from only said first one of said pair of instructions, and incrementing said specified address by a value of two when said combining step combines said pair of instructions into a single long instruction word.

9. The method of storing and fetching instructions set forth in claim 7, said combining step generating a long instruction word from only said first one of said pair of instructions when said predefined criteria are not met by combining said first instruction with a predefined no-operation instruction to form a long instruction word.

10. The method of storing and fetching instructions set forth in claim 9, said accessing step simultaneously accessing said pair of sequentially adjacent instructions.

11. The method of storing and fetching instructions set forth in claim 7, said accessing step simultaneously accessing said pair of sequentially adjacent instructions.

* * * * *